United States Patent

[11] 3,610,912

| [72] | Inventor | Alfred H. Schwartz<br>San Mateo, Calif. |
|---|---|---|
| [21] | Appl. No. | 752,629 |
| [22] | Filed | Aug. 14, 1968 |
| [45] | Patented | Oct. 5, 1971 |
| [73] | Assignee | Varian Associates<br>Palo Alto, Calif. |

[54] LOW PROFILE OPTICAL SYSTEM
13 Claims, 2 Drawing Figs.

[52] U.S. Cl. .................................................. 240/1.2,
240/46.45
[51] Int. Cl. .................................................. B64f 1/18
[50] Field of Search ........................................... 240/1.2,
41.1, 46.45, 11.2, 11.4, 41; 350/198, 199, 173;
313/113

[56] References Cited
UNITED STATES PATENTS

| 1,588,816 | 6/1926 | Sisson | 240/46.45 |
|---|---|---|---|
| 1,676,463 | 7/1928 | Ryan | 240/46.46 |
| 3,066,217 | 11/1962 | McDonald | 240/1.2 |
| 3,466,435 | 9/1969 | Brunner | 240/1.2 |
| 3,502,929 | 3/1970 | Richter | 313/113 X |

FOREIGN PATENTS

| 451,548 | 0/0000 | Switzerland | 350/198 |

*Primary Examiner*—John M. Horan
*Assistant Examiner*—T. A. Mauro
*Attorney*—Stanley Z. Cole ABSTRACT: The optical system consists of a negative meniscus lens mounted with its rim flush with the surface of a runway or other large area to be illuminated and its convex side facing upward. A conical mirror is coaxially mounted on the lower, concave surface of the lens. Directly beneath the conical mirror and facing upward is a coaxially mounted high-intensity, short arc lamp producing a parallel beam of light of a diameter equal to or slightly less than the largest diameter of the conical mirror. In use virtually all of the light from the lamp is reflected from the sides of the conical mirror and passes through the negative meniscus lens whence it emerges in a planar beam of light radiating in all directions around the axis of the system.

PATENTED OCT 5 1971

3,610,912

INVENTOR.
ALFRED H. SCHWARTZ
BY
Robert W Wilts
ATTORNEYS

LOW PROFILE OPTICAL SYSTEM

BACKGROUND OF THE INVENTION

This invention relates to low profile beacon lights which is to say lights that omnidirectionally project a sheet of light, or several distinct, approximately coplanar beams of light.

Low-profile beacon lights have heretofore found use primarily as airport runway marker lights. These devices have consisted essentially of a tubular encasement or well located just beneath the runway surface which houses an incandescent lamp. Means are located near the runway surface to deflect the beam of light emanating from the incandescent lamp and passing upwardly through the well to one or more directions at approximate right angles to the tubular well. A protective cover is mounted at or slightly above the runway surface.

In the prior art the light is usually projected in two oppositely directed beams oriented at but a slight incline to the runway. In this manner the marker light is visible both to aircraft on the runway surface and to aircraft making their final approach thereto, regardless of the direction in which the runway is in service. In the special case where the light is to be used in marking an aircraft carrier landing deck, a unidirectional beam suffices. In other applications the light projects a set of radial beams, while in still other cases the light distribution is omnidirectional.

Specific means heretofore used in projecting these various forms of low-profile light have included U.S. Pat. No. 2,191,379 which teaches an incandescent lamp bulb housed in a tubular well sunk beneath the ground in combination with a reflector having a paraboloid of revolution surface located just above the ground. From this reflector light is omnidirectionally reflected upwardly and outwardly through an annular window disposed normally to the terrain surface. A disc-shaped protective cover is mounted above the window. In U.S. Pat. No. 3,007,034 a sealed beam incandescent lamp is positioned in a tubular well to project a beam of light upwardly through a condensing lens to a small right triangular optical prism located at the surface of the surrounding terrain, which in this case is anticipated to be the deck of an aircraft carrier. The triangular prism reflects light from the sealed beam lamp into a unidirectional beam having an angle of but a few degrees incline to the horizontal.

U.S. Pat. No. 3,066,217 teaches the use of two back-to-back oriented prisms located adjacent a protective cover atop a subterranean well which houses a sealed beam filamentary lamp. This device projects a bidirectional beam of light inclined at but 4° above the horizontal while being almost flush with the surrounding terrain. U.S. Pat. No. 3,233,088 discloses a similar device except here an annular pyramidal prism is used in conjunction with a pyramidal reflector to project a set of radial beams.

None of the above examples of low-profile lights in the prior art have been productive of a light beam directed actually parallel to the horizontal. This has been true even though the structure of each has protruded slightly above the terrain surface. For these reasons none are ideally suited for use as anticollision beacon lights in high speed vehicles such as spacecraft and supersonic aircraft, where nose and tail mounting is not feasible. This is because protrusion of the light structure above the generally planar, surrounding fuselage surface would create adverse aerodynamic conditions such as drag and heat. At subsonic speeds any leading fuselage surface may be subjected to icing. Furthermore, with fuselage mounting the projection of a beam at even a slight incline to the horizontal would be unsatisfactory since at least one segment of the surrounding airspace, at the elevation in which the craft is operating, would not be directly in the projected beam.

Accordingly, it is an object of the present invention to provide a low-profile beacon light having an improved optical system.

More particularly, it is an object of the invention to provide an anticollision low-profile beacon light adapted to be mounted virtually flush with the skin of high-speed vehicles such as spacecraft or supersonic aircraft, which is capable of projecting an omnidirectional sheet of light parallel to the vehicle skin while but nominally disturbing the flow of air thereover.

Another object of the invention is to provide a beacon light capable of projecting from an upwardly facing window a beam of light having both slight negative and slight positive elevation.

Another object of the present invention is to provide a versatile low-profile beacon light which may be interchangeably used in airport runways, aircraft and spacecraft, and atop emergency automotive vehicles such as police cars.

Yet another object of the invention is to produce an optical system for a low-profile beacon light of simple and economic construction which is capable of reliably withstanding shock and vibration.

SUMMARY OF THE INVENTION

Briefly described, the present invention is an optical system adapted for use in a low-profile beacon light. The system comprises a negative meniscus lens having a virtual focal point located along the lens axis, and a right pyramidal mirror coaxially located along the lens axis between the lens and the virtual focal point of the lens with the apex end of the pyramidal mirror directed away from the lens. The optical system is capable of transforming a beam of light projected along the lens axis and onto the pyramidal mirror into a light beam comprising a substantially planar sheet of light oriented substantially normal to the lens axis.

DESCRIPTION OF THE PREFERRED EMBODIMENT

Figure 1:
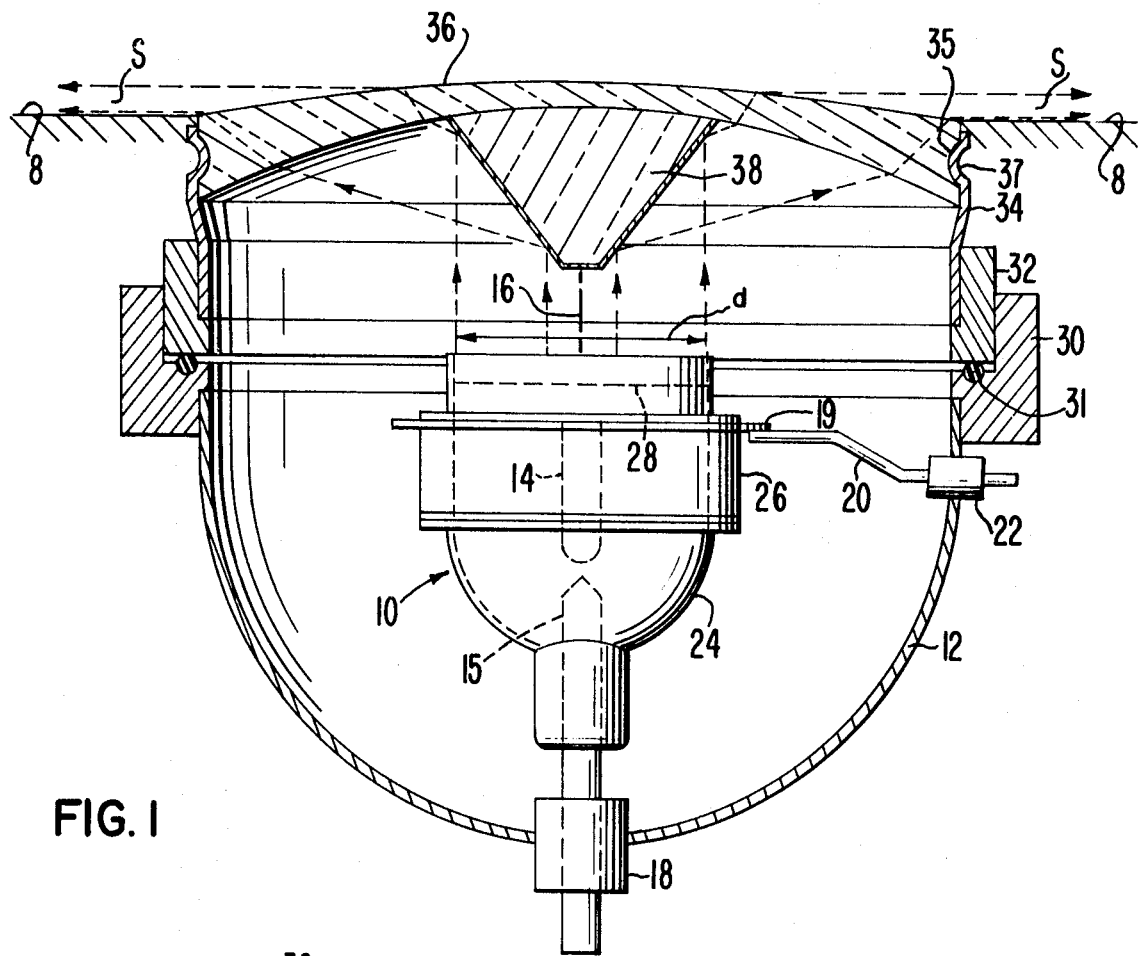
FIG. 1 is an elevational view shown partly in cross section of a low-profile beacon light containing the preferred embodiment of the optical system of the present invention.
Figure 2:
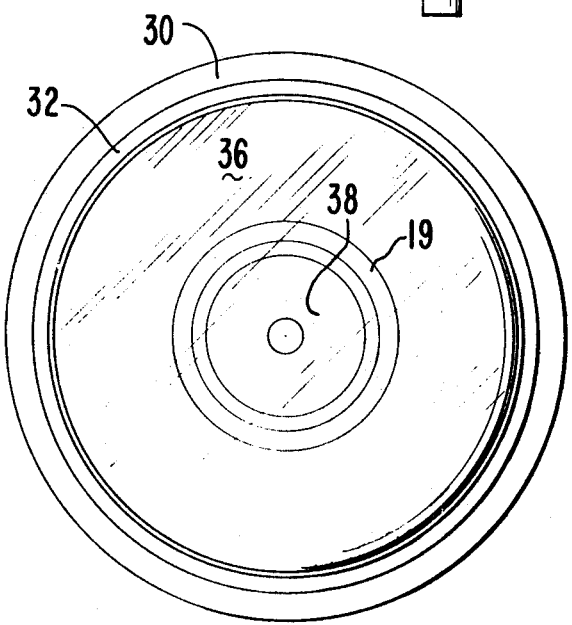
FIG. 2 is a top view of the low-profile beacon light illustrated in FIG. 1.

Referring now in more detail to the drawing, there is illustrated a generally tubular, low-profile beacon light mounted just beneath a substantially planar, surrounding opaque surface 8. The light comprises a high intensity short arc lamp 10 mounted within a cup-shaped, metallic well member 12. The lamp has two rod-shaped electrodes 14 and 15 spaced apart a short distance defining an arc gap therebetween. Each of the electrodes are mounted along axis 16 of the tubular well which is itself oriented normally to a surrounding planar surface 8. Electrode 15 protrudes axially from lamp 10 through insulated lamp mounting member 18, to the exterior of the lamp well where it is accessible to electric power. Electrode 14 is electrically connected to lamp flange 19 to which in turn is affixed lead-in wire 20. This lead-in wire extends through ceramic insulator 22 in well member 12 beyond which it too is accessible to extraneous electric power.

The envelope of lamp 10 further comprises a paraboloidal Kovar member 24, the inner surface of which serves as an integral reflector which may be coated with a layer of gold to reflect infrared radiation and heat out of the light. The envelope further comprises a tubular, ceramic member 26 and a disc-shaped optical window 28.

To the top of well member 12 is affixed a lower well-mounting ring 30 into which is coaxially recessed an upper mounting ring 32. A silicon rubber sealing ring 31 is interposed between the two mounting rings. A tubular well member 34, preferably made of aluminum or nickel, is coaxially fixed to upper well-mounting ring 32.

A transparent, negative meniscus optical lens 36 is coaxially fitted into well member 34 and pressure sealed to the upper convex surface 35 thereof. The concave surface 37 of the pressure seal abuts the substrate beneath surface 8. A right-circular, conical mirror 38 is coaxially cemented to the concave surface of lens 36 with the apex end of the mirror directed towards window 28 of arc lamp 10. As shown in the drawing, the mirror is preferably truncated for ease of assembly. The diameter of the truncated surface of mirror 38 has approximately the same diameter as electrode 14.

When lamp 10 is ignited, a narrow light beam of diameter $d$ is projected against mirror 38. A portion of this beam is reflected from the truncated surface of the mirror back to the lamp. This reflected portion however is quite small due to the fact that the truncated mirror surface lies in the shadow of electrode 14. The balance of the beam, as shown by the sample rays, strikes the conical surface of mirror 38 and is reflected into a beam of diverging light of annular cross sections which in turn strikes the concave surface of lens 36. From this concave surface the light is refracted upwardly through the optical lens to the convex surface thereof where it enters the medium above surface 8. Upon entering this medium the light is refracted downwardly into a plane parallel with surface 8, thereby forming a thin sheet of light S.

The illustrated embodiments projects an essentially planar sheet of light. Other light patterns may, however, be formed by substituting other pyramidal mirrors for preferred right-conical mirror 28. For example, a pyramidal mirror having several planar, triangular surfaces may be used to project a segmented sheet of light. Mirror surfaces generated by the revolution of a curve rather than a straight line may also be used. By varying the contour and slope of the mirror surface one may produce either a thin or thick beam, as viewed in cross section, and may project a beam having either positive or even slight negative elevation with respect to surface 8. Furthermore, the maximum width of the pyramidal mirror may be made less than that of the beam emitted by the lamp to form two separate and distinct light beams, one having a low with the other having a high profile. The lamp itself may emit either a continuous or modulated light beam.

The transparent, negative meniscus lens may be made of glass where light in the visible portion of the spectrum is to be projected. Where visible light of high intensity or infrared radiation is to be projected, the lens is preferably made of quartz. The word "light" is herein intended to include visible, near infrared and near ultraviolet radiation.

The use of a spherical lens renders the optical system relatively inexpensive since spherical lenses are easy to grind and polish. If desired, an antireflective coating may be applied to the concave surface of the lens. A filter may also be mounted between the lamp and mirror.

The use of a high intensity short arc lap enables the low-profile beacon light to assume a relatively small overall size. For example, high-intensity arc lamps are available today which provide sufficient illumination to be used as runway beacon lights with optical systems of the present invention having a lens diameter of but 3 inches. This is substantially less than the width of modern aircraft tires. Consequently, the optical system need support only a fraction of the weight of an aircraft which might roll over it. Furthermore glass and quartz are quite strong in compression. The use of a negative meniscus lens with its convex surface exposed insures that such weight will be transformed into force. That the lens is spherical tends to evenly distribute mechanical forces to which it is subjected. For reinforcement a screen mesh may be placed over the convex surface.

It should be understood that the above-described embodiments are merely illustrative of applications of the principles of the invention. Obviously many modifications may be made in these specific examples without departing from the spirit and scope of the invention as set forth in the following claims.

I claim:

1. An optical system adapted for use in a low profile beacon light and comprising:
    A. A negative meniscus lens having a virtual focal point located along the lens axis, said lens having a thickness which increases from its center to its edge, and
    B. A pyramidal mirror coaxially located along said lens axis between said lens and said focal point adjacent to the concave surface of said lens with the apex end of said pyramidal mirror directed away from said lens.

2. An optical system in accordance with claim 1 wherein said pyramidal mirror is affixed to said concave surface of said negative meniscus lens.

3. An optical system in accordance with claim 1 wherein said pyramidal mirror is conical.

4. An optical system in accordance with claim 3 wherein said conical mirror is right circular.

5. An optical system in accordance with claim 4 wherein said conical mirror is truncated along a plane oriented normally to the mirror axis.

6. A low-profile beacon light comprising:
    A. A lamp adapted to project a beam of light along a predetermined axis,
    B. A negative meniscus optical lens coaxially located along said axis with its concave surface facing said lamp, said lens having a thickness which increases from its center to its edge, and
    C. A pyramidal mirror coaxially located along said axis between said lamp and said lens a distance from said lens less than the focal length of said lens, the apex end of said pyramidal mirror being directed towards said lamp, WHEREBY a beam of light projected from the lamp is diverged by the pyramidal mirror and thereby transformed into a beam of light of annular cross section which beam is in turn further diverged by the negative meniscus lens and thereby transformed into a light beam comprising a substantially planar sheet of light oriented substantially normal to the predetermined axis.

7. A low-profile beacon light in accordance with claim 6 wherein said pyramidal mirror is conical.

8. A low-profile beacon light in accordance with claim 7 wherein said conical mirror is right circular.

9. A low profile beacon light in accordance with claim 8 wherein said conical mirror is truncated along a plane oriented normally to the conical mirror axis thereby forming a plane, circular mirror surface.

10. A low-profile beacon light in accordance with claim 9 wherein said lamp is a high-intensity short arc lamp having 2 rod-shaped, spaced electrodes positioned along the axis of said right circular conical mirror.

11. A low-profile beacon light in accordance with claim 10 wherein the diameter of said electrodes and said plane, circular mirror surface are substantially the same.

12. A low-profile beacon light in accordance with claim 6 wherein said pyramidal mirror is affixed to the concave surface of said negative meniscus optical lens.

13. A low-profile beacon light in accordance with claim 6 wherein said lamp is a sealed beam, short arc lamp having two spaced rod-shaped electrodes located along said predetermined axis, and wherein said pyramidal mirror and said negative meniscus lens are positioned to have radial symmetry with respect to said predetermined axis.